United States Patent [19]

Freiberger et al.

[11] 3,880,396

[45] Apr. 29, 1975

[54] QUICK CHANGE PANEL FASTENING SYSTEM

[75] Inventors: Robert W. Freiberger, Parma Heights, Ohio; Elwood S. Michaels, Roanoke, Va.

[73] Assignee: Eaton Corporation, Cleveland, Ohio

[22] Filed: Oct. 25, 1973

[21] Appl. No.: 409,649

[52] U.S. Cl. ......... 248/475 R; 24/221 R; 24/221 L; 40/125 R; 248/201; 248/224; 248/223
[51] Int. Cl. ............................................ A44b 17/00
[58] Field of Search ..................... 24/93, 221–222; 40/315, 125; 248/224, 225, 475 R

[56] References Cited
UNITED STATES PATENTS

| 701,079 | 5/1902 | Peckham | 248/224 R |
|---|---|---|---|
| 1,261,363 | 4/1918 | Crist | 248/165 |
| 2,817,914 | 12/1957 | Rosen | 40/142 R |
| 2,940,558 | 6/1960 | Schlueter | 24/221 L |
| 3,179,367 | 4/1965 | Rapata | 24/221 L |
| 3,264,770 | 8/1966 | Baptie | 40/10 R |
| 3,270,995 | 9/1966 | Shears | 248/224 |
| 3,298,071 | 1/1967 | Flora | 24/221 L |

FOREIGN PATENTS OR APPLICATIONS

| 17,228 | 9/1895 | United Kingdom | 24/93 |

Primary Examiner—Bernard A. Gelak
Attorney, Agent, or Firm—Teagno & Toddy

[57] ABSTRACT

An improved apparatus for mounting a panel on a base includes a pair of quarter-turn fasteners which are disposed in spaced apart openings on the base. The fasteners have outwardly projecting hanger portions. The panel is provided with a pair of spaced apart keyhole spaced openings having relatively large circular end portions which are spaced apart by a distance greater than the distance between the centers of the quarter-turn fasteners. Relatively narrow slot portions of the keyhole openings project inwardly toward each other and have semicircular end surfaces. The centers of these semicircular end surfaces are spaced apart by a distance which is equal to the distance between the centers of the fasteners. To mount the panel on the fasteners, it is merely necessary to resiliently deflect or bow the panel outwardly so that the relatively large circular end portions of the keyhole shaped openings can be fitted over the outwardly projecting hanger portions of the fasteners. The bowed panel is then released and its natural resiliency causes the panel to straighten. As the panel straightens, the narrow slot portions of the keyhole openings move into engagement with the hanger portions of the fasteners to retain the panel on the base.

4 Claims, 6 Drawing Figures

PATENTED APR 29 1975 3,880,396

QUICK CHANGE PANEL FASTENING SYSTEM

BACKGROUND OF THE INVENTION

The present invention relates to improvements in the mode of securing panels, such as signs, letters, or the like, to a base structure.

A variety of different constructions are utilized and known for securing panels, such as signs or letters, to a base. Such structures include a variety of different types of fasteners, including screws and bolt type fasteners which cooperate with both the panel and the base to clamp the panel to the base. All of the known structures are relatively difficult to install as compared with the present invention.

SUMMARY OF THE PRESENT INVENTION

The present invention is directed to a simplified structure for quickly and easily mounting a panel on a base. The present invention utilizes a pair of fasteners; namely, quarter-turn type of fasteners, which may be readily secured to the base. The quarter-turn fasteners each have a projecting portion which is adapted to be received in an opening in a panel which is to be secured to the base. The panel is resiliently deflectable so that it may be deformed and thereby openings therein may be positioned over projecting portions of the fastener, and then on release of the deformation force the sign may be restored to its undeformed condition and thereby be received on the fasteners to thereby connect the panel or the like to the base.

DESCRIPTION OF THE FIGURES

Features and advantages of the present invention will be apparent to those skilled in the art to which it relates from the following description of a preferred embodiment thereof made with reference to the accompanying drawings in which.

DESCRIPTION OF THE PREFERRED EMBODIMENT

The present invention as noted hereinabove relates to a method or means of securing a panel to a base with the use of quarter-turn fasteners. Quarter-turn fasteners, of course, are well known and there are a multitude of different constructions thereof. However, the present invention is considered to provide an improvement in the art relating to the securing of panels onto a base through the use of such quarter-turn fastener constructions.

Figure 1:
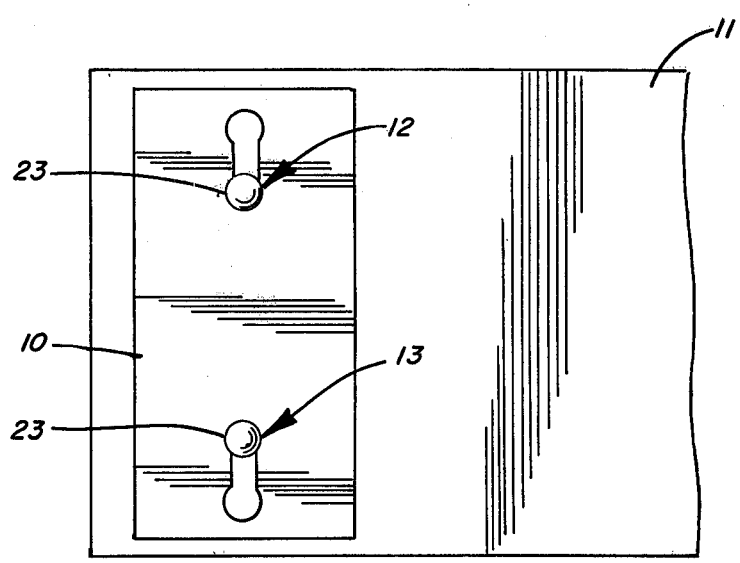
FIG. 1 illustrates a structure in which a panel is secured to a base by means of a pair of fasteners.

As shown in FIG. 1, a panel 10 is secured to a base 11 through the use of a pair of quarter-turn fasteners 12, 13. The base 11 may be of any suitable construction and could be the base of a sign or the like, and the panel 10 may be a resiliently deflectable letter which is adapted to be secured to the base 11 to form a word, or may in itself be a sign which is adapted to be mounted on the base 11. The panel 10 is a sheet metal panel member which can be resiliently deflected or deformed in order to apply the panel to the base 11.

Figure 4:
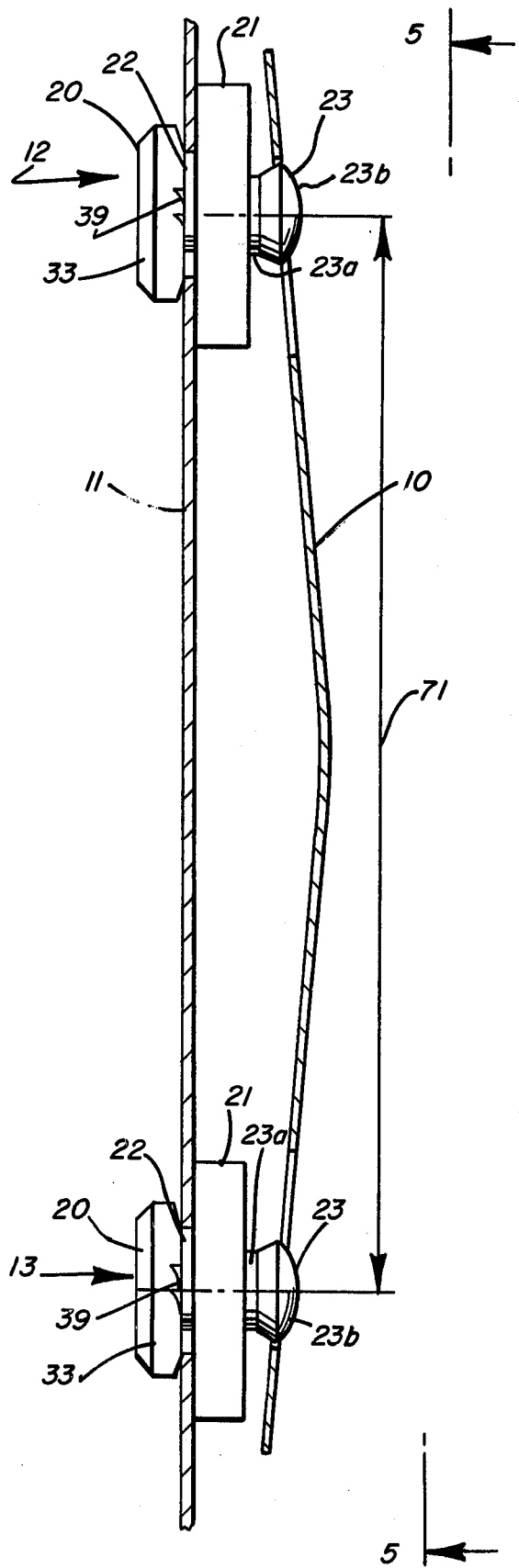
FIG. 4 illustrates a sectional view showing a pair of fasteners secured to the base and a panel in a bowed condition as it is being positioned on the fasteners.

The quarter-turn fasteners 12, 13 may be of any suitable construction,, and as shown in FIG. 4 include a nose portion 20 which is located on the backside of the base 11, a head portion 21 located on the front side of the base portion 20 and a shank portion 22 which interconnects the head portion 21 and the nose portion 20. In addition, the head portion 21 has a projecting panel securing or hanger portion 23 which extends from the head portion 21 outwardly in a direction opposite the direction from which the shank 22 extends from head 21. The hanger portion 23 has a cylindrical shank 23a (FIG. 4) and an enlarged end portion 23b.

Figure 2:
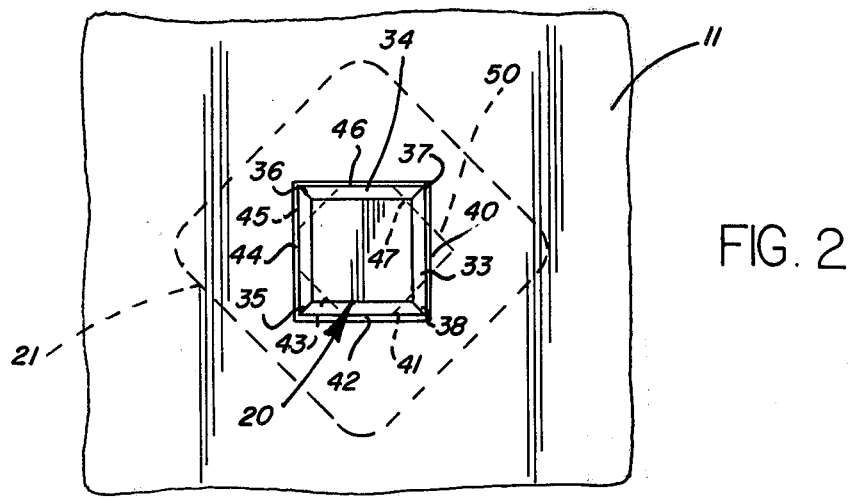
FIG. 2 is an enlarged view illustrating the position of one of the fasteners and base prior to the fastener being rotated to a position securing the fastener to the base.
Figure 3:
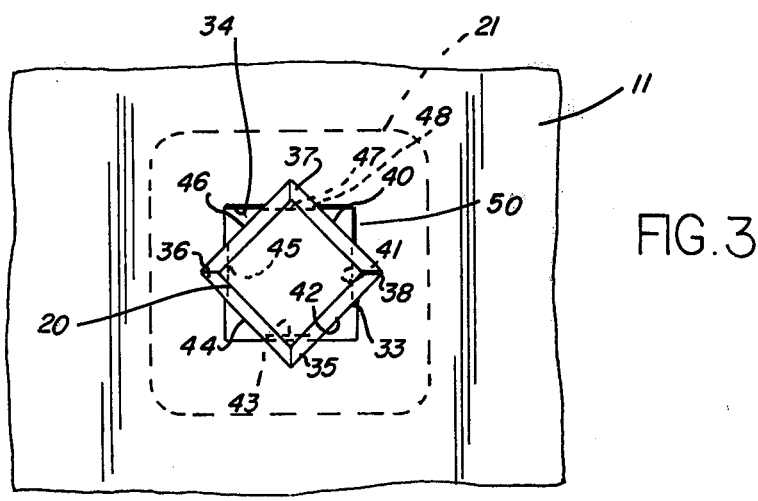
FIG. 3 illustrates the position of the fastener and base of FIG. 2 after rotation of the fastener to secure it to the base.

As shown in FIG. 2, the nose portion 20 is preferably square in cross section and includes a generally inverted truncated portion 33 to facilitate insertion of the nose through a square opening 34 in the base 11. The nose 20 preferably is of a slightly smaller cross-sectional dimension than that of the opening 34 in the base 20. Thus, by insertion of the nose 20 through the opening 34 and by turning the fastener through an angle of approximately 45°, the four corners 35–38 of the nose 20 are brought to overlie the confronting marginal edges presented by the opening 34 in the base 11, such as shown in FIG. 3. To facilitate a rotary gripping action of the fasteners 12, 13 with the base 11, the nose portion 20 is preferably provided with leading or cam-like ledge portions 39 (FIG. 4) which taper generally in the direction of rotation of the fasteners.

The shank portion 22 which connects the nose 20 with the head 21 of the fasteners 11, 12 is preferably polygonal-shaped in cross section. As shown in FIGS. 2 and 3, the shank portion 22 is preferably octagonal in cross section defining eight equilateral sides 40 to 47. As shown, the shank 22 is oriented in relation to the nose 20 so that the four opposed flat sides 40, 42, 44 and 46 of the shank 22 are co-extensive in cross-sectional dimension with, or lie in the same vertical plane as the four corresponding flat sides of the square-shaped nose portion 20. Accordingly, it can be seen that the cross-sectional dimension of the nose 20 across the sides 40, 42, 44 and 46 is slightly smaller than that of the corresponding dimension of the square-shaped opening 34 in the base 11. Thus, upon insertion of the nose 20 through the opening 34 in the base 11, at least one flat side of the shank 22, namely, one of the sides 40, 42, 44 and 46 will be in surface-to-surface engagement with the confronting marginal edge presented by the panel opening 34, and after rotary fractional turning of the fastener through an angle of approximately 45°, at least one of the other flat sides, namely, one of the sides 41, 43, 45 and 47 will be in surface-to-surface engagement with the confronting edge of the opening 34 to provide positive interlocking engagement between the base 11 and the fastener 10, such as shown in FIG. 3.

To further achieve locking engagement between the base 11 and the fastener 12, the shank portion 22 is provided with severable edge portions 48, as best seen in FIG. 3. Since by turning the greater dimension of the shank 12 transversely of the base 11, there is provided a firm coating engagement with the confronting marginal edges of the opening 34 in the base 11. Due to the fact that the marginal edges of the opening 34 cut into the severable edge portions of the shank 22 as the fastener is turned into its assembled position of FIG. 3 from the position in which it is originally insertd into the opening 34, which position is illustrated in FIG. 2.

Moreover, as best shown in FIGS. 2 and 3, the shank portion 22 of the fastener 11 is provided with a projecting tab portion 50 which is basically triangular in plan view as shown in FIGS. 2 and 3, and which is formed integrally with the side portion 40 thereof. The tab portion 50, as shown in FIG. 2, is too large to be inserted through the opening 34 in the base 11 when the fastener is secured in the base initially and therefore the tab portion 50 engages on the front side surface of the base when the nose 20 is initially inserted through the opening 34 in the base 11. However, upon rotation of the fastener relative to the base, the tab portion 50 moves across the front face and while there may be some deformation of the fastener, the tab portion 50 eventually takes a position, such as shown in FIG. 3, in which it may snap into the area of the opening 34 in the base member which is interposed between adjacent side edge surfaces defining the opening 34 in the base member. When the tab portion 50 snaps into the position shown in FIG. 3 in which it is engaged in the opening 34, the tab portion 50 provides a substantially continuous surface-to-surface locking engagement between the shank 22 and the panel opening 34. Such continuous surface-to-surface disposition of the locking fastener shank portion 22 and the panel or base 11 prevents accidental displacement or loosening of the fastener from its final installed position with the panel with the base 11.

From the above, it should be apparent that the identical fasteners 12, 13 which are utilized in the present construction are quarter-turn fasteners which may be readily secured in the openings in the base 11. In fact, in order to effect installation of the fasteners 12, 13, a suitable tool or the like may be provided and cooperating portions of the fastener may be provided to be engageable by the tool so that the fasteners may be readily turned in the openings in the base 11 so as to be secured therein as described above. In addition, while the above construction may be generally considered conventional, reference is made to U.S. Pat. No. 3,298,071 which generally discloses such a fastener for being secured in an opening in a panel member or the like such as described hereinabove.

Figure 5:
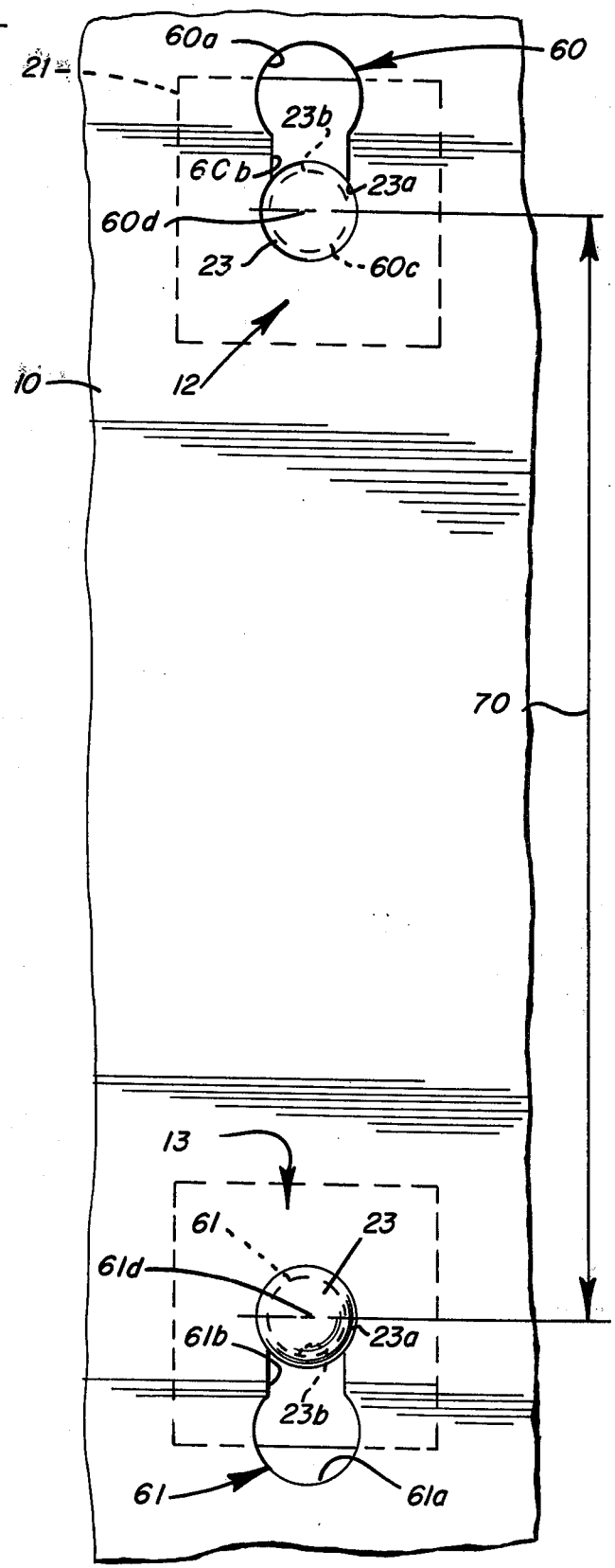
FIG. 5 is a view, taken approximately along the line 5—5 of FIG 4, illustrating the panel in a straightened position on the fastener.
Figure 6:
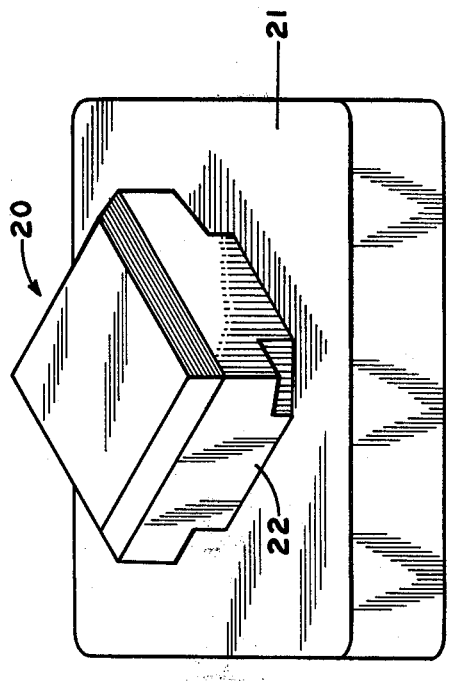
FIG. 6 is a perspective of the fastener of the present invention.

The present invention involves the utilization of the fasteners 12, 13 to secure a deformable panel 10 on the base 11. The deformable panel 10 may be either a letter or the like. The letter or panel 10 is provided with spaced identical key-hole openings, best shown in FIG. 5, which are designated 60, 61. The keyhole opening 60 includes an enlarged portion 60a and a slot portion 60b which communicates with the enlarged portion 60a. Likewise, the keyhole opening 61 includes an enlarged portion 61a and a slot portion 61b. The enlarged portions 60a and 61a have a diameter which is slightly greater than the maximum diameter of the outer ends 23b of the hanger portions 23 of the fasteners 12 and 13. The slot portions 60a and 60b have a transverse dimension which is less than the diameter of the outer ends 23b of the hanger portions 23 and greater than the diameters of the shanks 23a of the hanger portions.

The slot portions 60b, 61b extend toward each other. The slot portions 60b, 61b are defined at their adjacent ends by circular surfaces 60c, 61c. The centers 60d, 61d of the surfaces 60c, 61c are located a distance apart which is designated in FIG. 5 as 70. The distance 70 corresponds with the distance 71 (FIG. 4) which is the distance between the centers of the openings 34 in the base member 11.

In addition, it should be clear that the enlarged portions 60a, 61a of the keyhole openings 60, 61, respectively, are located farther apart than that of the surfaces 60c, 61c. Accordingly, by resiliently deflecting the panel 10 to bow it outwardly as shown in FIG. 4, it is possible to move the enlarged portions 60a, 61a closer together. When the panel 10 has been sufficiently bowed, the centers of the enlarged portions 60a, 61a are located a distance which is substantially equal to the distance designated 70, 71 in FIGS. 4 and 5.

Accordingly, it should be clear that once the fasteners 12, 13 are secured in the openings in the base member 11, it is possible to mount the panel member 10 thereon by merely resiliently bowing the panel into the position wherein the openings portions 60a, 61a are located in alignment with the enlarged portions which project from the head portion 21 of the fasteners 12, 13. Once this has been accomplished, the panel may be moved laterally so that the enlarged portions 23 on the fasteners extend through the enlarged opening portion 60a, 61a. Once the panel has been received over those projecting portions, the resiliently bowed panel is released. The panel will return to its undeformed state into the position shown in FIG. 5 where the portions 23 on the fasteners 12, 13 are located in engagement with the surfaces 60c, 61c in the slot portions 60, 61. Accordingly, it should be clear that the fastener may be utilized by merely deformation of the panel 11 for securing the panel on the base 10. Thus, the present invention provides a simple and reliable way of securing a panel to a base without the necessity of any type of screw connection and without the necessity of the use of any particular tools, even without the neec for a tool such as a screwdriver or the like.

Having described a preferred embodiment of the invention, what is claimed is:

1. An apparatus for securing a deformable panel to a base having a pair of spaced apertures and which panel has a pair of spaced keyhold openings therein each of which keyhole openings includes a large opening portion and a slot portion communicating therewith and extending toward each other and which slot portions terminate in a circular surface and where the distance between the centers of the circular surfaces approximates the distance between the centers of the apertures in the base, said apparatus comprising a pair of one-piece fasteners to be secured in the apertures in the base, each of said fasteners comprising a rotary fractional turn fastener, each of said fractional turn fasteners comprising a nose portion for passage through said apertures and locking engagement on the backside of the base and a head portion for location on the front side of the base and a shank portion interconnecting said head and nose portions, each of said fasteners including means for interlocking said fasteners with the base upon rotation thereof relative to the base, said head portion having a projecting hanger portion extending away from the base, said hanger portion having an end portion of a diameter which is less than the diameters of the enlarged portions of the keyhole openings and is greater than the transverse dimension of said slot portions of said keyhole openings, a hanger portion shaft connecting said end portion and said shank portion having a transverse dimension which is slightly less than the transverse dimensions of said slot portions of said keyhole openings, whereby said panel upon deformation may be deformed to align the enlarged portion of the keyhole openings in the panel with said hanger portions for insertion of said hanger end portions through said enlarged portions of the keyhole openings and on a relaxing of the force providing said deformation enabling the hanger portion shaft to move into said slot portions in the panel and thereby secure the panel to the base.

2. The apparatus of claim 1 wherein said apertures in the base are of generally square configuration, said nose portions of said fasteners have generally square configurations of a size which is slightly less than the size of the apertures in the base and said shank portion has at least one pair of parallel surfaces spaced apart by a distance generally equal to the separation of said aperture sides, said pair of parallel surfaces being angularly offset the sides of said generally square nose portion.

3. The apparatus of claim 2 wherein said shanks are of a generally octagonal cross-sectional configuration, four of said shank edges being parallel with the sides of said nose portion.

4. An apparatus for use in association with a base having a pair of spaced apart apertures, said apparatus comprising a pair of fasteners adapted to be secured to said base in an aperture therein, said fastener having a nose portion for extension through the aperture and a first shank for receipt in the aperture, said nose portion having projecting portions which engage the rear side of the base upon rotation of the fastener relative to the base, said fastener having a first head adapted to engage the front face of the base and which is in clamping engagement therewith upon rotation of the fastener relative to the base and the head portion of said fastener having a projecting hanger portion thereon which projects perpendicularly to the base and which is defined by a second head and a second shank interconnecting the second head to the first head, and a member received in encircling relation with the second head on the fastener and held on the base by the fastener, said member including surface means for defining a pair of keyhole openings having an enlarged portion of a diameter which is greater than the diameter of said second head and a slot portion of a transverse dimension which is smaller than the diameter of said second head and greater than the diameter of said second shank.

* * * * *